United States Patent [19]
Burns

[11] 3,870,921
[45] Mar. 11, 1975

[54] IMAGE INTENSIFIER TUBE WITH IMPROVED PHOTOEMITTER SURFACE

[75] Inventor: James W. Burns, Altadena, Calif.

[73] Assignee: Xerox Corporation, Stamford, Conn.

[22] Filed: Sept. 24, 1973

[21] Appl. No.: 400,296

[52] U.S. Cl. ........ 313/346 R, 250/213 VT, 313/94, 313/102, 313/384
[51] Int. Cl. .......................... H01j 1/14, H01j 19/06
[58] Field of Search ............ 313/94, 102, 346, 384, 313/385, 386; 250/213 VT

[56] References Cited
UNITED STATES PATENTS

| | | | |
|---|---|---|---|
| 3,403,278 | 9/1968 | Kahng et al. | 313/94 X |
| 3,571,646 | 3/1971 | Kiuchi | 313/94 |
| 3,575,628 | 4/1971 | Word | 250/213 VT |
| 3,696,262 | 10/1972 | Antydas | 313/94 |
| 3,783,324 | 1/1974 | Wronski et al. | 313/94 |

Primary Examiner—Alfred E. Smith
Assistant Examiner—Saxfield Chatmon, Jr.

[57] ABSTRACT

An image intensifier tube in which the efficiency and wavelength span of the photoemitter are increased by providing on a light transmissive surface a thin film of a Group II–VI compound intermediate the amorphous screen of the tube and the photoemitter surface. The thin transparent film is preferably zinc selenide or zinc sulfide with the photoemitter being a layer of gallium arsenide or another compound or alloy prepared from the elements of Group III and Group V of the period table of elements. The thickness of the film is preferably about 1.0 micrometers, and the film is heat treated at 400°C – 500°C in an inert gas for a selected period of time.

8 Claims, 3 Drawing Figures

IMAGE INTENSIFIER TUBE WITH IMPROVED PHOTOEMITTER SURFACE

BACKGROUND OF THE INVENTION

Conventional image intensifier tubes include a photoemitter surface (photocathode) consisting generally of a film of antimony treated with an alkali metal, such as cesium, sodium, or potassium, which lowers the work function of the antimony. The film is deposited on an optical surface, which may consist of a concave glass surface, or a planar intermediate glass surface. The glass substrate may be formed on various glasses or silicas, and in the present state of the art, may be formed on an assembly of glass or silica fibers, that is, a fiber optic bundle.

Image intensifiers using photoemitter surfaces consisting of a film of antimony treated with an alkali metal are not totally acceptable because the alkali-antimony film is not a sufficiently efficient photocathode to permit images of high brightness to be observed. These films also suffer in that the long wavelength cut-off limit for operation does not extend into the infrared region of the spectrum. Thus, the subject being viewed must be illuminated with visible light. This shortcoming in the state-of-the-art devices arises from the fact that the alkali-antimony film, particularly the cesiated antimony film, is insensitive to light waves or photons of energy lower than the minimum energy difference between electrons in its valence and conduction energy bands. This energy difference in cesiated antimony is sufficiently large as to prevent excitation and escape to the vacuum space in the image tube of electrons unless the incident light from the subject being viewed consists of photons whose energy corresponds to the visible or ultra-violet regions of the optical spectrum. Photons with energies corresponding to the infrared region of the spectrum do not have enough energy to excite electrons sufficiently in cesiated antimony to enable them to escape. State-of-the-art devices are therefore limited by the visible illumination on the subject.

It has recently been demonstrated by various workers in the art that the operation of photoemitter surfaces can be extended into the near infrared portion of the optical spectrum by replacing the cesiated antimony film with a layer of cesiated gallium arsenide, or a layer of cesiated gallium-indium-arsenide, or a layer of cesiated indium phosphide, or a layer of cesiated indium-arsenide-phosphide. However, high efficiency with these photoemitter surfaces has been achieved only in those cases where the cesiated surface was formed on a cleaved face of a bulk single crystal of gallium arsenide, or gallium-indium-arsenide, or indium phosphide, or indium-arsenide-phosphide. Since the bulk single crystals of these compounds act as both electron absorbers and optical absorbers, it has not heretofore been possible to achieve high photoemission efficiencies with these materials other than in the reflection mode of operation, that is, the emitted electrons must be observed or collected from a direction opposite to that of the impinging light rays which generate the electrons. In am image intensifier tube, it is highly desirable to observe or collect the electrons in the same direction as the impinging light rays. This is customarily referred to as the transmission mode of operation. In the conventional image intensifier tube, this is accomplished since the cesiated antimony film is deposited in the form of a transparent thin film.

SUMMARY OF THE INVENTION

It is therefore an object of the present invention to provide an improved image intensifier tube.

It is another object of the present invention to provide an image intensifier tube that will operate in the transmission mode.

It is another object of the present invention to provide an image intensifier tube that will operate in the transmission mode with increased image brightness.

It is a further object of the present invention to provide an image intensifier tube that operates over a wide range of the spectrum.

It is a further object of the present invention to provide an image intensifier tube that will operate in the near-infrared portion of the spectrum.

It is a further object of the present invention to provide an image intensifier tube having a photoemitter surface of improved efficiency.

It is still a further object of the present invention to provide a photoemitter surface of improved efficiency.

The aforementioned objects are achieved by a photoemitter structure which permits the formation of either large-grained polycrystalline or single crystal thin films of gallium arsenide, gallium-indium-arsenide, indium phosphide, or indium-arsenide-phosphide, or other compounds or alloys formed from the elements of Group III and Group V of the periodic table of elements on various amorphous optical surfaces, particularly on the glass screen of an image intensifier tube. Being amorphous in nature, the optical surfaces cannot withstand temperatures of 400°C to 500°C, with the result that it has not heretofore been possible to form on these surfaces large-grained polycrystalline or single crystal layers of gallium arsenide or other compounds or alloys formed from the elements of Group III-Group V of the periodic table, these compounds requiring high formation temperatures.

It is therefore proposed to use a thin film formed of a compound prepared from the elements of Group II and Group VI of the periodic table of elements as an intermediate layer between the amorphous (glass) optical surface of the image intensifier tube and the photoemitter surface formed of a cesiated thin film of gallium arsenide or of another compound or alloy prepared from the elements of Group III and Group V of the periodic table of elements. It has been discovered that a thin transparent film of a compound prepared from the elements of Group II and Group VI of the periodic table of elements, such as zinc selenide or zinc sulfide, can be deposited on the optical surfaces in large-grained polycrystalline form, or with preferred crystallographic orientation over the entire surface, or in single form, at temperatures below 400°C. Since the crystallographic lattice constant or lattice parameter of zinc selenide very closely matches that of gallium arsenide, 5.667 angstroms compared to 5.563 angstroms, gallium arsenide can then be sputtered or deposited onto the zinc selenide film, and since the zinc selenide provides a monocrystalline substrate for the gallium arsenide, or at worst a large-grained polycrystalline film with preferred orientation, the gallium arsenide assumes the crystallographic quality of the zinc selenide substrate. Large-grained gallium arsenide films prepared in this manner will have high efficiency and extend the wavelength span of operation to the near-infrared.

Prior art devices have been restricted to reflection mode gallium arsenide photocathodes, and as stated heretofore attempts to prepare transmission mode tubes by depositing the gallium arsenide directly on the glass optical substrate have not been successful. The attempts have failed because of the amorphous nature of the glass or silica substrate surface. The use of an intermediate layer formed of a Group II-Group VI compound, such as zinc selenide, solves this problem and permits the preparation of thin film photocathodes for use in transmission mode image intensifier tubes.

Other objects of the invention will become readily apparent to those skilled in the art in view of the following detailed disclosure and description thereof, especially when read in conjunction with the accompanying drawings.

DESCRIPTION OF THE PREFERRED EMBODIMENT

Figure 1:
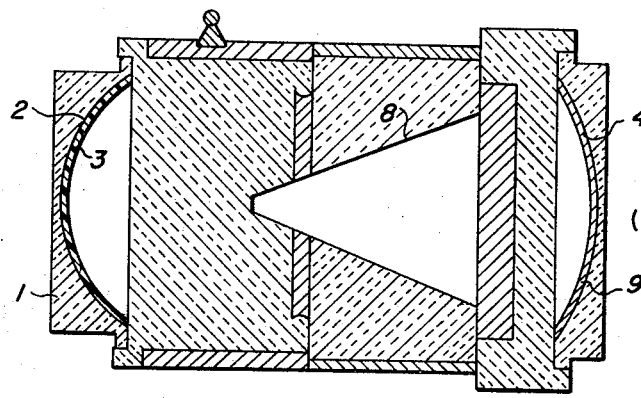
FIG. 1 is a cross-sectional view of an image intensifier tube of the prior art.

Image intensifier tubes employing thin films or layers of very fine-grained cesiated antimony as photoemitters or photocathodes are well known in the optical and electronic art. One type of image intensifier tube employing such a cesiated antimony layer is shown in cross-section in FIG. 1. In this image intensifying device, light enters the optical element 1 from the left side. The optical element 1, which may consist of a bundle of fiber optics, has an optically polished concave surface 2 on its right face. In fabricating this device, a thin layer 3 of antimony is deposited on the concave surface 2 by evaporating antimony in a vacuum and allowing the antimony to condense on the surface 2. The antimony is then treated with cesium, sodium and/or potassium, and it is thereby converted from metallic antimony to a complex semiconductor of low work function. When light of suitable wavelengths (visible light) is transmitted through the fiber optics from the left side to strike the layer 3, electrons are excited in the cesiated antimony layer 3, and these electrons absorb sufficient energy from the impinging light to enable them to escape from the cesiated antimony layer, that is, the electrons gain sufficient energy to surmount the potential barrier between the cesiated antimony layer 3 and the surrounding vacuum.

Once in the vacuum space to the right of layer 3, the electrons are accelerated and focused by the anode focusing cone 8 onto the concave surface 4 which may be coated with any of several semiconducting phosphors 9. In operation, when the electrons are focused on and incident upon the phosphor layer 9 on the surface 4, the phosphor glows or emits visible light, forming an image of the subject viewed through the tube, said subject being the source of light rays incident on the optical element 1 from the left side. When properly designed, the images formed by such image intensifier tubes are brighter than those which could be seen by the naked eye without the tube.

State-of-the-art image intensifier tubes, such as the one exemplified in FIG. 1, are inadequate in that the cesiated antimony layer 3 is not a sufficiently efficient photocathode to permit images of high brightness to be observed. They suffer also in that the long wavelength cut-off limit for operation does not extend into the near-infrared region of the spectrum. Thus the subject being viewed must be illuminated with visible light. This shortcoming arises from the fact that the cesiated antimony layer 3 is insensitive to light waves or photons of energy lower than the minimum energy difference between electrons in its valence and conduction energy bands. This energy difference in cesiated antimony is sufficiently large as to prevent excitation and escape to the vacuum space of electrons unless the incident light from the subject being viewed consists of photons whose energy corresponds to the visible or ultra-violet regions of the optical spectrum. Photons with energies corresponding to the infrared region of the spectrum do not have enough energy to excite electrons sufficiently to enable them to escape.

Figure 2:
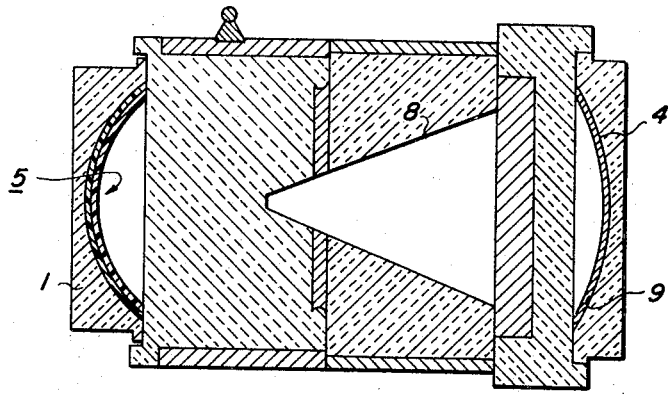
FIG. 2 is a cross-sectional view of the image intensifier tube in accordance with the present invention.
Figure 3:
FIG. 3 is an enlarged view of the photoemitter of the tube of FIG. 2.

The foregoing difficulties and disadvantages of the prior art device of FIG. 1 are overcome by improving the structure of the photoemitter of the device of FIG. 1, or of the other type of photoemissive surfaces in other types or styles of light responsive devices. Referring now to FIG. 2, in which components corresponding to those of FIG. 1 have the same reference numerals, the photoemitter layer 3 of the device of FIG. 1 is replaced by a more efficient photoemitter generally indicated as 5 and shown enlarged, in portion, in FIG. 3. Photoemitter 5 includes a photoemissive layer 6 which may be gallium arsenide, gallium-indium-arsenide, indium phosphide, indium-arsenide-phosphide, and other compounds and solid solutions formed from the elements of Group III and Group V of the periodic table of elements. The use of any one of these new materials, however, requires that it be deposited on the surface 2 in such form that the size of each single crystal grain in the deposited layer be equal to or greater than the cross-sectional area of the optical fibers that make up the optical element 1, if the surface is to be an efficient photoemitter. This is not readily accomplished with any of the compounds or solid solutions composed of elements from Group III and Group V of the periodic table. The problem lies in the amorphous structure of the surface 2, and the low temperature limitation, 400°C through 500°C, imposed on the deposition process by the nature of the optical element 1.

This problem has been surmounted in the invention disclosed herein by introducing a very thin, between 5 and 0.5 micrometer thick, and preferrably 1 micrometer thick, intermediate film 7 of zinc selenide or cadmium sulfide, or a film of another compound formed from the elements of Group II and Group VI of the periodic table of elements, between the surface 2 and the photoemissive layer 6. Layer 6, which preferably has a thickness in the range of about 1 to 10,000 angstrom units, is preferably surface treated with an alkali metal, such as cesium, sodium, or potassium, to lower its work function.

It has been found that the film 7 can be formed directly on the amorphous surface 2. Film 7 is deposited conventionally, such as by evaporating in a vacuum powdered zinc selenide or cadmium sulfide, or other Group II-VI compounds, from a tantalum combustion boat using a conventional vacuum belljar apparatus. This method for deposition of film 7 is only one of several available in the art. Heat treatment in accordance with the invention, as described hereinafter, can then be performed. Reflection electron diffraction photography has shown that the structure of the thin film 7 deposited on surface 2 is polycrystalline in nature, but that the sizes of the grains are larger than can be achieved when gallium arsenide is deposited on the surface 2. It has also been established by means of reflection electron diffraction photography that all of the single crystal grains in a polycrystalline film of zinc selenide have a similar crystallographic orientation, that is, there is a preferred crystallographic orientation which is found over the entire area of the thin film 7 deposited on the surface 2. Whereas it has been possible to achieve this preferred crystallographic orientation with thin layers or films of zinc selenide and zinc sulfide, it has not been accomplished on an amorphous surface with gallium arsenide or any other compound or solid solution formed from the elements of Group III and Group V of the periodic table.

When a compound formed from the elements of Group III and Group V of the periodic table is deposited on the film 7, by any conventional process, for example, in the case of gallium arsenide, evaporating arsenic and gallium in a vacuum and allowing the gallium and arsenic to condense on the surface of film 7, the gallium arsenide assumes the same crystallographic orientation as the underlying film 7, and the crystal grain sizes in the gallium arsenide layer are comparable to those of the underlying layer 7. Thus compounds of Group III-Group V of the periodic table are formed with crystal grains that have a similar crystallographic orientation and a larger size than can be achieved if a Group III-Group V compound is deposited directly on the amorphous surface 2. As a result, layer 6, when treated with an alkali metal, such as, for example, cesium, potassium or sodium, to lower its work function, provides a photoemitter which will operate in the transparent mode with efficiencies higher than those previously achieved. This result can be attributed to the larger single crystal grain size achieved by the layer 6 when the latter is deposited on a polycrystalline film with a preferred crystallographic orientation rather than being deposited directly on the amorphous glass face 2. Treatment by the alkali metal is achieved by evaporating the alkali metal in a vacuum and allowing the metal to condense on the exposed surface of layer 6.

It has been found further that the crystal grain size of the film 7 can be increased significantly by heat treatment at between 400°C and 500°C in an inert gas, such as argon, for an extended period, between 100 and 200 hours. Again, this is in contrast to what can be achieved by similar heat treatment of films formed from the elements of Group III and Group V of the periodic table, such as gallium arsenide. In the latter case such heat treatment does not increase the grain size significantly. When a substrate film such as zinc selenide is so heat-treated, and the gallium arsenide or other compound or solid solution formed from elements of Group III and Group V of the periodic table is then deposited on the zinc selenide film and cesiated, it is found that a still further enhancement of the photoemissive characteristics of the cesiated gallium arsenide results from the increased grain size caused by the heat treatment of the zinc selenide.

While the present invention has been described with reference to a preferred arrangement thereof, it will be understood to those skilled in the art that various changes may be made without departing from the true spirit and scope of the invention as set forth in the appended claims.

What is claimed is:

1. In an image intensifier tube having an amorphous optical surface, a photocathode comprising:
   a thin film of a first compound prepared from the elements of Group II and Group VI of the periodic table deposited directly on said amorphous optical surface, and
   a layer of a second compound prepared from the elements of Group III and Group V of the periodic table deposited on said film, said first and second compounds having closely matched crystallographic lattice constants.

2. The tube of claim 1 wherein said film is selected from the group consisting of zinc selenide, zinc sulphide, and cadmium sulphide, and said layer is gallium arsenide.

3. The tube of claim 1 wherein said layer is treated with an alkali metal to lower its work function.

4. A photocathode formed on an amorphous optical surface and comprising:
   a thin film of a compound prepared from the elements of Group II and Group VI of the periodic table deposited directly on said amorphous optical surface, and
   a layer of a compound prepared from the elements of Group III and Group V of the periodic table deposited on said film, said film and said layer having closely matched crystallographic lattice constants.

5. The photocathode of claim 4 wherein said film is selected from the group consisting of zinc selenide, zinc sulphide, and cadmium sulphide, and said layer is gallium arsenide.

6. The photocathode of claim 4 wherein said layer is treated with an alkali metal to lower its work function.

7. A process for forming a photocathode on an amorphous surface comprising the steps of:
   depositing directly on said surface a thin film of a compound formed from the elements of Group II and Group VI of the periodic table of elements,
   heat treating said thin film to increase the crystal grain size of said film, and
   depositing on said film a layer of a compound formed from the elements of Group III and Group V of the periodic table of elements.

8. The method of claim 7 in which the heat treating entails heating the film in an inert gas for an extended period.

* * * * *